US006526871B1

(12) United States Patent
Zhu et al.

(10) Patent No.: US 6,526,871 B1

(45) Date of Patent: Mar. 4, 2003

(54) MONOBLOC PISTON FOR DIESEL ENGINES

(75) Inventors: Xiluo Zhu, Ann Arbor, MI (US); Randall R. Gaiser, Chelsea, MI (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 09/939,195

(22) Filed: Aug. 24, 2001

(51) Int. Cl.[7] .................................................. F16J 1/04

(52) U.S. Cl. .......................................... 92/231; 92/208

(58) Field of Search .......................... 92/208, 214, 224, 92/222, 231

(56) References Cited

U.S. PATENT DOCUMENTS

| | | | | |
|---|---|---|---|---|
| 3,971,355 | A | | 7/1976 | Kottmann |
| 4,161,165 | A | | 7/1979 | Belush et al. |
| 4,213,438 | A | | 7/1980 | Elsbett et al. |
| 4,286,505 | A | | 9/1981 | Amdall |
| 4,292,937 | A | | 10/1981 | Vallaude |
| 4,704,950 | A | | 11/1987 | Ripberger et al. |
| 4,843,952 | A | | 7/1989 | Ripberger |
| D322,969 | S | | 1/1992 | Ballheimer et al. |
| 5,081,968 | A | | 1/1992 | Bruni |
| 5,150,517 | A | | 9/1992 | Martins Leites et al. |
| 5,211,101 | A | | 5/1993 | Letsch et al. |
| 5,359,922 | A | | 11/1994 | Martins Leites et al. |
| 5,701,802 | A | | 12/1997 | Junge |
| 5,934,174 | A | | 8/1999 | Abraham, Sr. et al. |
| 6,131,544 | A | | 10/2000 | Zakharov et al. |
| 6,260,472 | B1 | * | 7/2001 | Zhu et al. ................. 92/231 X |
| 6,401,595 | B1 | * | 6/2002 | Bochart ....................... 92/186 |

FOREIGN PATENT DOCUMENTS

| | | |
|---|---|---|
| WO | WO9620340 | 7/1996 |

* cited by examiner

*Primary Examiner*—Edward K. Look
*Assistant Examiner*—Igor Kershteyn
(74) *Attorney, Agent, or Firm*—Reising, Ethington, Barnes, Kisselle, Learman & McCulloch, P.C.

(57) ABSTRACT

A steel monobloc piston for diesel engines is formed with a relatively short piston skirt whose lower edge resides below the axis of the pin bores of the piston, but located at or above a lowest tangent point of the pin bores. The piston body preferably has a closed oil cooling gallery and the skirt is preferably joined at its upper end to an outer wall of the piston in which a plurality of ring grooves are formed.

8 Claims, 2 Drawing Sheets

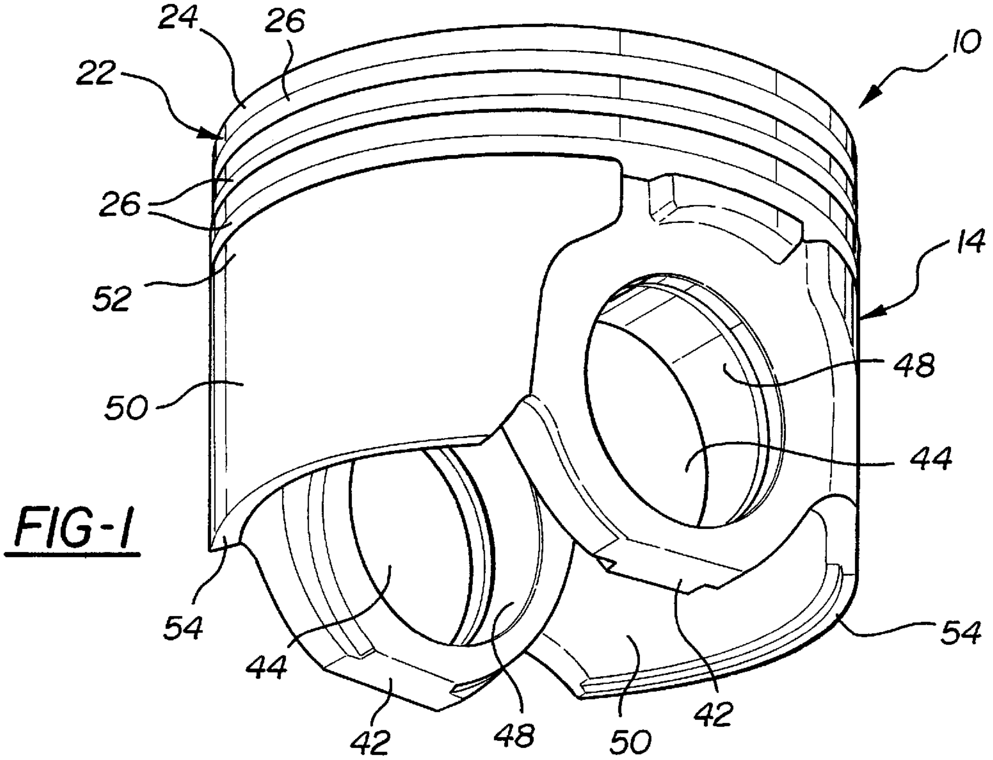
FIG-1
FIG-2
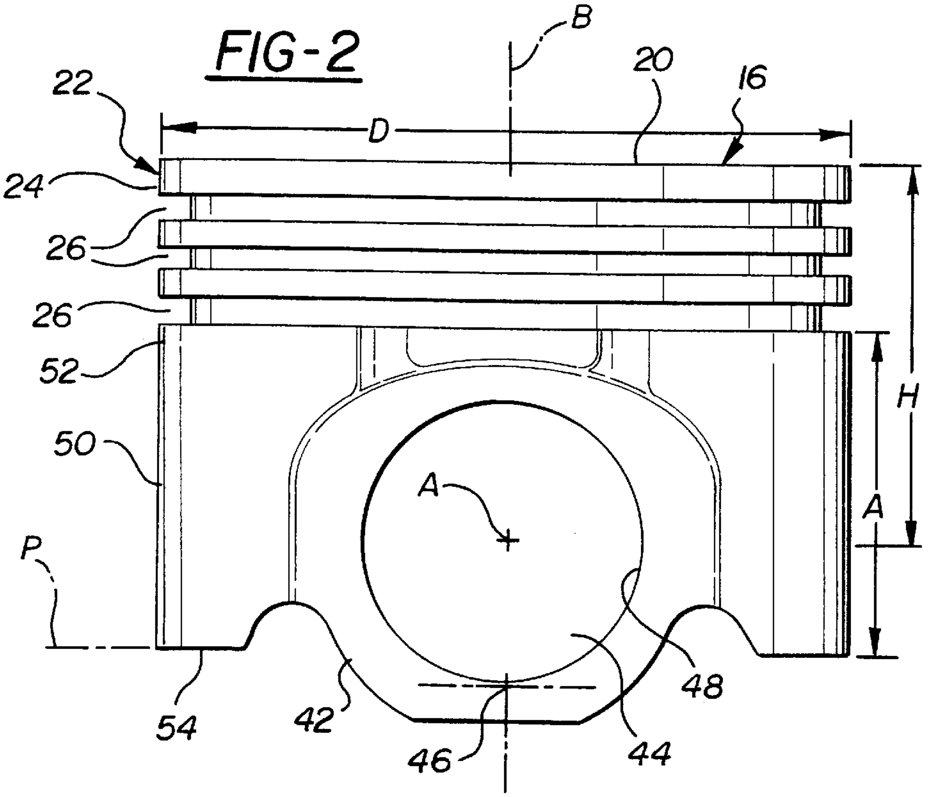

MONOBLOC PISTON FOR DIESEL ENGINES

BACKGROUND OF THE INVENTION

1. Technical Field

This invention relates generally to monobloc pistons for diesel engine applications in which the piston skirt is formed as one integral piece with the piston body, and more particularly to the construction of the piston skirt.

2. Related Art

Monobloc pistons for diesel engine applications are known wherein the piston skirt is formed as an integral portion of the piston body, as opposed as being articulated, Such pistons are known to have piston skirts that are of such length and/or are positioned such that the lower edge of the skirt extends well below the bottom of the pin bosses to provide the desired support and guidance to the piston as it reciprocates within the cylinder of the engine. Such low lying skirts, however, can extend outside of the cylinder liner at bottom dead center position of the piston and can lead to scuffing of the piston skirt and/or liner due to the sudden change in load and direction as the piston returns upwardly in the cylinder. In addition, the low lying skirt interferes with the location of oil injection nozzles which direct cooling oil up into the piston, requiring the skirt to be notched in the area of the nozzle to provide clearance. Examples of such monobloc pistons are disclosed in U.S. Pat. Nos., 4,161,165 and 4,286,505, as well as published international application WO 9620340. The piston disclosed in the latter publication has a short, low lying piston skirt which is uncoupled from the ring belt and, due to the wide gap between the bottom of the ring belt and the top of the skirt as well as the low, remote positioning of the skirt, transfers some of the piston guidance duties to the ring lands near the top of the piston, which is less efficient and could cause damage to the ring lands as well as decrease the performance of the piston.

U.S. Pat. No. 4,704,950 discloses a high performance automotive piston for gasoline engines which is manufactured entirely of aluminum and would be unsuitable for high compression diesel applications to which the present invention is directed.

It is an object of the present invention to provide a monobloc piston for diesel engines that overcomes or greatly minimizes the deficiencies of the prior art pistons described above.

SUMMARY OF THE INVENTION AND ADVANTAGES

A piston for diesel engines constructed according to a presently preferred embodiment of the invention comprises a piston body fabricated of steel having an outer wall and a closed oil gallery. A pair of pin bosses have axially aligned pin bores and a lowest tangency point of the pin bores. The piston body has a skirt that is formed as one piece with the pin bosses and is coupled at its upper end to the outer wall so as to form a continuous extension of the outer wall. The piston skirt has a lower edge spaced below the pin bore axis, but located at or above the lowest tangency point of the pin bores.

The invention also contemplates a diesel engine which includes an engine block having at least one cylinder bore and a monobloc piston disposed in the cylinder bore having a piston body fabricated of steel and including a pair of pin bosses with aligned pin bores disposed about a pin bore axis and having a lowest tangent point to the pin bores. A piston skirt is formed as one piece with the pin bosses and has a lower edge disposed below the pin bore axis at or above the lowest tangent point of the pin bores.

The invention has the advantage of providing a steel monobloc piston for diesel engine applications fitted with a short skirt made of the same steel material of such size and location relative to the remainder of the piston body to provide efficient guidance to the piston during reciprocation in the cylinder bore to reduce loading on the ring lands due to its high location relative to the pin bores. The high location of the lower edge of the skirt prevents the skirt from extending from the bottom of the cylinder bore at bottom dead center of the piston, and thus minimizes or eliminates scuffing of the skirt caused by a sudden change in load or direction when the piston returns upwardly. The relatively high location of the lower edge of the skirt also provides ample clearance for the oil jet nozzles, eliminating the need for clearance notches in the lower edge of the skirt so as to present a continuous, non-interrupted lower leading edge of the skirt which is stronger and easier to manufacture than notched skirts.

The overall reduction and the height of the skirt further has the advantage of simplifying the manufacture of forged steel pistons. The shorter length enables production of a relatively thinner, more uniform thickness skirt wall as compared to forged skirts of greater length which are generally thicker due to the required draft angle to enable forging of the piston skirt.

THE DRAWINGS

These and other features and advantages of the present invention will become more readily appreciated when considered in connection with the following detailed description and appended drawings, wherein:

FIG. 1 is a bottom perspective view of a piston constructed according to the invention;

FIG. 2 is a side elevation view of the piston of FIG. 1;

DETAILED DESCRIPTION

Figure 3:
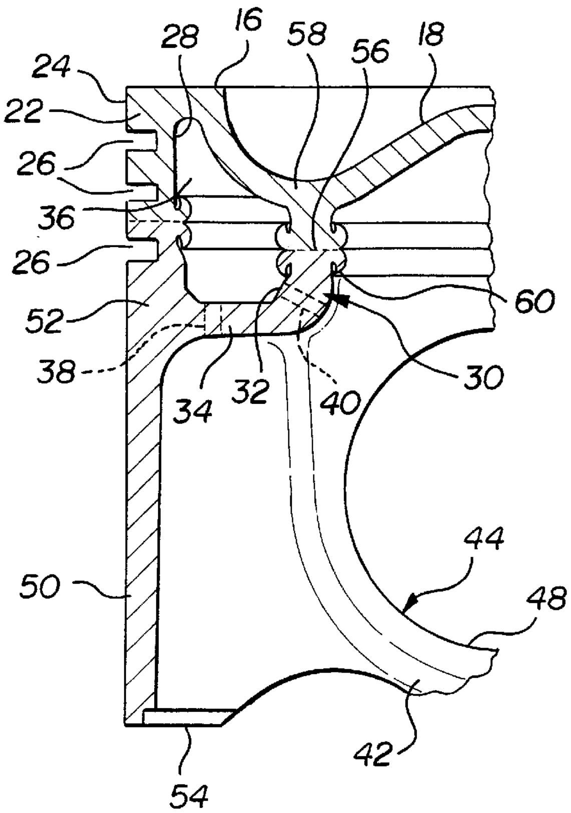
FIG. 3 is a fragmentary elevation view like FIG. 2, but shown partly in section.
Figure 4:
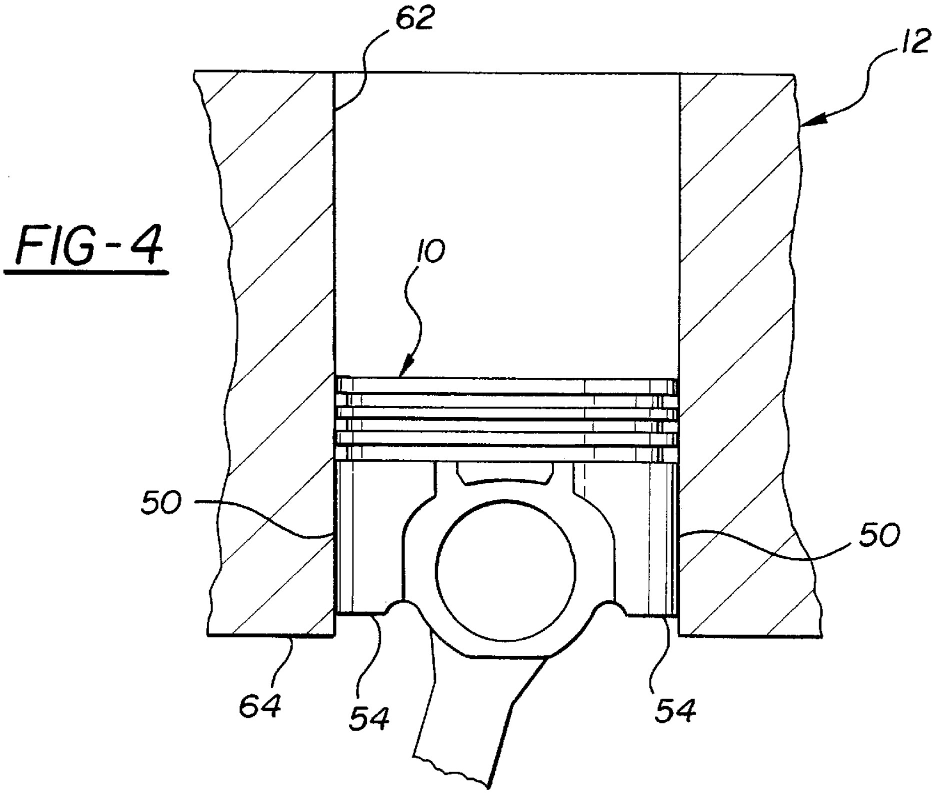
FIG. 4 is a schematic, fragmentary sectional view of a diesel engine shown equipped with the piston of FIGS. 1–3.

A piston constructed according to the invention is shown generally at in FIGS. 1–3 and is shown installed as part of a diesel engine 12 in FIG. 4.

The piston 10 includes a piston body 14 having a top wall 16 formed with a combustion bowl or crater 18 extending downwardly from a top surface 20 of the top wall 16.

The piston body 14 includes an outer annular wall or ring belt 22 having an outer surface 24 formed with a plurality of ring grooves 26 for receiving piston rings (not shown). The outer wall 22 includes an annular inner surface 28 facing radially inwardly of the piston body 14 opposite the outer surface 24.

The piston body 14 includes an annular inner wall 30 extending downwardly from the combustion bowl 18 having a radially outwardly facing annular surface 32 spaced radially inwardly from the inner surface 28 of the outer wall 22.

The piston body 14 preferably includes a bottom wall 34 which extends between and interconnects the lower end regions of the outer wall 22 and inner wall 30 in spaced relation to the top wall 16. The top wall 16 and outer wall 22 and inner walls 30 bound an annular cooling chamber or gallery 36 for receiving cooling oil which is preferably closed at the bottom by the bottom wall 34. By "closed", it is not meant that the gallery is entirely self contained, but includes provision for openings and passages for introducing oil into and draining oil from the gallery 36. A representative oil inlet opening 38 is shown in FIG. 3, as is a representative oil drainage passage 40 according to convention. The bottom wall 34 is formed as one piece with the lower regions of the outer wall 22 and inner wall 30 and serves, in addition to closing the gallery 36, as a structural web or bridge between the outer and inner walls 22, 30.

The piston body 14 includes a pair of pin bosses 42. The pin bosses 42 are formed of one piece with the inner wall 30 and preferably extend downwardly from the bottom wall 34 and are set radially inwardly from the outer surface 24 of the outer wall 22. The pin bosses 42 are formed with pin bores 44 which receive a wrist pin (not shown) for connecting the piston 10 to a connecting rod (not shown) of the engine 12. The pin bores 44 are aligned about a common pin bore axis A, which represents a center line of the pin bores with respect to a longitudinal axis B of the piston body 14. The pin bores 14 have a lowest tangent point 46, which represents the lowest part of the pin bores 44 in the longitudinal direction, with the tangency point 46 determined by passing a plane P through the piston body 14 perpendicular to the longitudinal axis B which contains the lowest point of the pin bore surfaces 48 of the pin bores 44, as illustrated in FIG. 2.

The piston body 14 includes a piston skirt 50 that is formed as one piece with the pin bores 44, such that the piston body 14 has a monobloc structure with a fixed skirt, rather than a separate skirt articulated to the pin bosses by the wrist pin (not shown). The skirt 50 is further preferably formed with an upper end region 52 coupled directly to the outer wall 22, such that the piston skirt 50 is formed as continuous downward extension of the outer wall 22 below the bottom wall 34. As such, the piston skirt 50 is also interconnected as one piece with the bottom wall 34, as illustrated best in FIG. 3.

The piston skirt 50 has a lower, marginal free edge 54 which defines the lowest part of the skirt 50 in the longitudinal direction of the piston body 14. According to the invention, the location of the lower edge 54 is such that is provides a relatively short piston skirt 50 as compared to conventional piston skirts. Particularly, the lower edge 54 of the piston skirt 50 is disposed at a location which is below the level of the pin bore axis A but which is at or above the lowest tangent point 46 of the is pin bores 44, and more preferably above the lowest tangent point 46.

In addition to the longitudinal relationship of the lower edge 54 of the piston skirt 50 relative to the pin bores 44, the piston body 14 has the following dimensional ratios: H/D=0.5–0.75, A/D=0.3–0.6, and A/H=0.7–1.2, where H is the compression height of the piston body 14 measured between the top surface 20 of the piston body and the axis A of the pin bores 44, D equals the piston diameter and A equals the axial length between the lowest ring groove 26 and the lower edge 54 of the piston skirt 50, as shown best in FIG. 2.

As shown best in FIGS. 1 and 2, the lower edge 54 of the piston skirt 50 is relatively smooth and continuous and free of any clearance notches for oil nozzles or the like.

The piston body 14 is preferably fabricated of at least two separate parts which are separately formed and then subsequently joined to one another across ajoint or joints 56. In the illustrated embodiment, the piston body 14 includes an upper part 58 and a lower part 60 which, when joined together, form the enclosed cooling gallery 36. The joint 56 of the preferred embodiment is preferably a friction weld joint. However, the invention contemplates other approaches to joining separately formed piston parts, such as bonding, brazing, bolting, joint threads, etc. which would operate to unite the separately formed parts as a single, unified structure once joined for service as a piston body 14. In the present embodiment, the lower part 60 includes the pin bosses 42, piston skirt 50, bottom wall 34, and lower portions of the outer and inner walls 24, 30, with the friction weld joint 56 provided in the outer and inner walls 22, 30. The lower part 60 is preferably forged from steel. The upper includes the top wall 16, the bowl 18, and upper portions of the outer walls 22 and inner wall 30 which are joined across the joint 56 to the lower portions of the outer wall 22 and inner wall 30 to unite the structure.

FIG. 4 illustrates the piston 10 described above installed in the diesel engine 12 for reciprocation within at least one associated cylinder 62 of the engine 12. The piston 14 is illustrated in its bottom dead center position, which is the lowest point that the piston 10 travels in the cylinder 62. It will be seen that the piston skirt 50 is contained within the cylinder 62, such that the lower edge 54 of the skirt 50 does not extend below the lower edge 64 of the cylinder 62 in which it reciprocates.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A piston for diesel engines, comprising:

a piston body fabricated of steel;

said piston body having an outer wall and a closed oil gallery;

a pair of pin bosses having pin bores formed therein, said pin bores having a common pin bore axis and a lowest tangency point;

a skirt formed as one piece with the pin bosses, said skirt coupled at an upper end to said outer wall; and said piston skirt having a lower edge disposed below said pin bore axis and located at or above said lowest tangency point of said pin bores.

2. The piston of claim 1 wherein said piston body includes the following dimensional ratios:

(H/D)=0.5–0.75

(A/D)=0.3–0.6

(A/H)=0.7–1.2 where,

H=compression height of the piston body between a top of the piston and the axis of the pin bores, D=piston diameter, and A=axial length between the lowest ring groove and the lower edge of piston skirt.

3. The piston of claim 1 wherein said piston body is fabricated of at least two separate parts which are connected across at least one joint.

4. The piston of claim 3 wherein said at least one joint comprises a friction weld joint.

5. A piston for a diesel engine, comprising:

a piston body fabricated of steel and having a ring belt;

a pair of pin bosses having alighted pin bores disposed about a pin boar axis and having a lowest tangent point of said pin bores;

a skirt formed as one piece with said pin bores and having an upper end region coupled directly to said ring belt and a lower edge disposed below said pin bore axis and at or above said lowest tangent point of said pin bores.

6. A diesel engine comprising:

an engine block having at least one cylinder bore;

a monobloc piston disposed in said cylinder bore having a piston body fabricated of steel having a ring belt and having a pair of pin bosses with aligned pin bores disposed about a pin bore axis and having a lowest tangent point of said pin bores; and a piston skirt formed as one piece with said pin bosses, said skirt having an upper end region coupled directly to said ring belt and a lower edge disposed below said pin bore axis at or above said tangent point of said pin bores.

7. The diesel engine of claim 6 wherein said piston body includes the following dimensional ratios:

(H/D)=0.5–0.75

(A/D)=0.3–0.6

(A/H)=0.7–1.2 where,

H=compression height of the piston body between a top of the piston and the axis of the pin bores, D=piston diameter, and A=axial length between the lowest ring groove and the lower edge of the piston skirt.

8. The diesel engine of claim 6 wherein the cylinder has a lower edge and said lower edge of said piston skirt is disposed at or above said lower edge of said cylinder when said piston is at a lowest point of travel in said cylinder.

* * * * *